(12) United States Patent
Hashimoto et al.

(10) Patent No.: US 7,704,631 B2
(45) Date of Patent: Apr. 27, 2010

(54) SECONDARY BATTERY WITH IMPROVED SHOCK RESISTANCE

(75) Inventors: Tatsuya Hashimoto, Ishikawa (JP); Kouki Inoue, Osaka (JP); Kiyomi Kouzuki, Osaka (JP); Yasushi Hirakawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/918,984

(22) PCT Filed: Mar. 7, 2006

(86) PCT No.: PCT/JP2006/304310

§ 371 (c)(1),
(2), (4) Date: Oct. 7, 2008

(87) PCT Pub. No.: WO2006/114940

PCT Pub. Date: Nov. 2, 2006

(65) Prior Publication Data

US 2009/0081530 A1    Mar. 26, 2009

(30) Foreign Application Priority Data

Apr. 22, 2005 (JP) .............................. 2005-124629

(51) Int. Cl.
*H01M 2/12* (2006.01)
*H01M 2/08* (2006.01)

(52) U.S. Cl. ......................................... 429/56; 429/185
(58) Field of Classification Search .................. 429/56, 429/185
See application file for complete search history.

(56) References Cited

U.S. PATENT DOCUMENTS 4,943,497 A * 7/1990 Oishi et al. ................... 429/53

FOREIGN PATENT DOCUMENTS

| JP | 08-153496 | | 6/1996 |
|----|-----------|---|--------|
| JP | 08-153511 | * | 6/1996 |
| JP | 09-129195 | | 5/1997 |
| JP | 09-274900 | | 10/1997 |
| JP | 09-274934 | | 10/1997 |
| JP | 11-007932 | | 1/1999 |
| JP | 11-260347 | | 9/1999 |
| JP | 2000-058024 | | 2/2000 |

(Continued)

*Primary Examiner*—Dah-Wei D Yuan
*Assistant Examiner*—Brent Thomas
(74) *Attorney, Agent, or Firm*—McDermott Will & Emery LLP

(57) ABSTRACT

In a secondary battery (1) comprising a battery case (2) for accommodating an electrode plate group (3) and an electrolyte, with one open end of the battery case (2) being sealed with an assembled sealing plate (11) that accommodates a safety mechanism (17) for exhausting pressure in the event of pressure build-up in the battery case (2) exceeding a predetermined level, at least one part (13a) of vent holes (13a, 13b, 13c) in the assembled sealing plate (11) facing the inside of the battery case (2) is constituted of an aperture that results from formation of a turned-out portion (23), the distal end of the turned-out portion (23) being allowed to abut on an insulating plate (4a) that makes contact with one end of the electrode plate group (3) so as to restrict movement of the electrode plate group (3). This can prevent malfunctioning due to displacement of the electrode plate group (3) when an impact or vibration is applied.

9 Claims, 8 Drawing Sheets

FOREIGN PATENT DOCUMENTS

| | | |
|---|---|---|
| JP | 2000-182592 | 6/2000 |
| JP | 2001-135299 | 5/2001 |
| JP | 2001-325926 | 11/2001 |

* cited by examiner

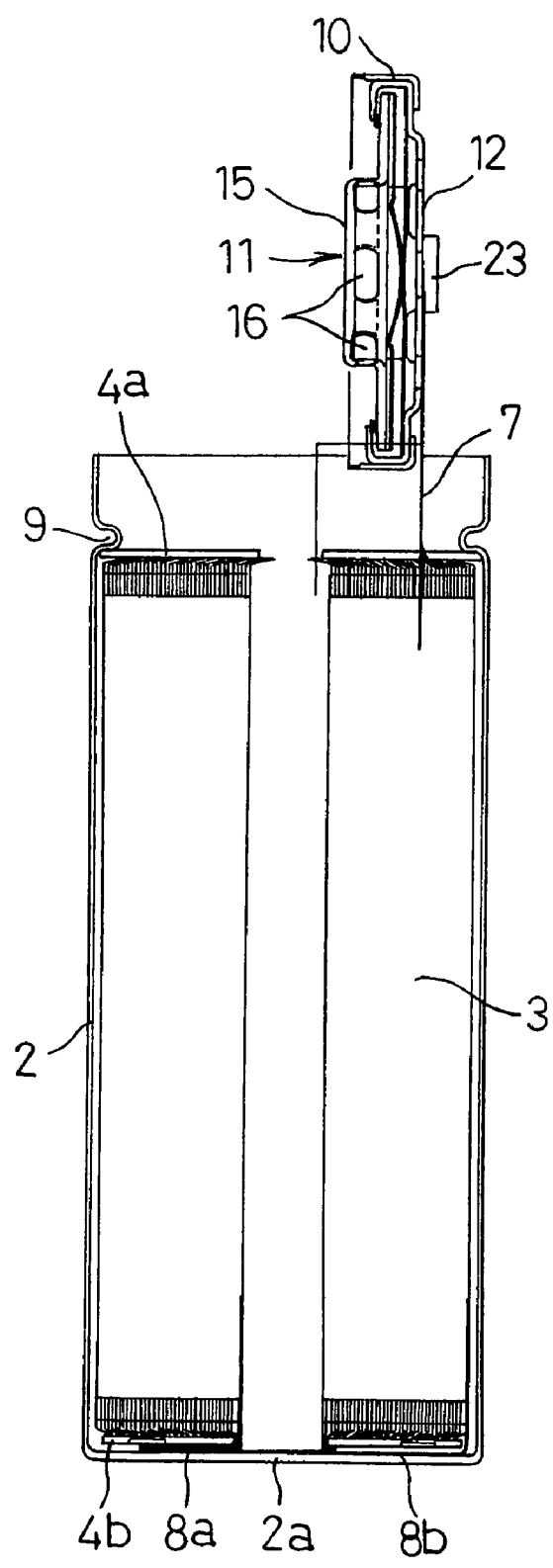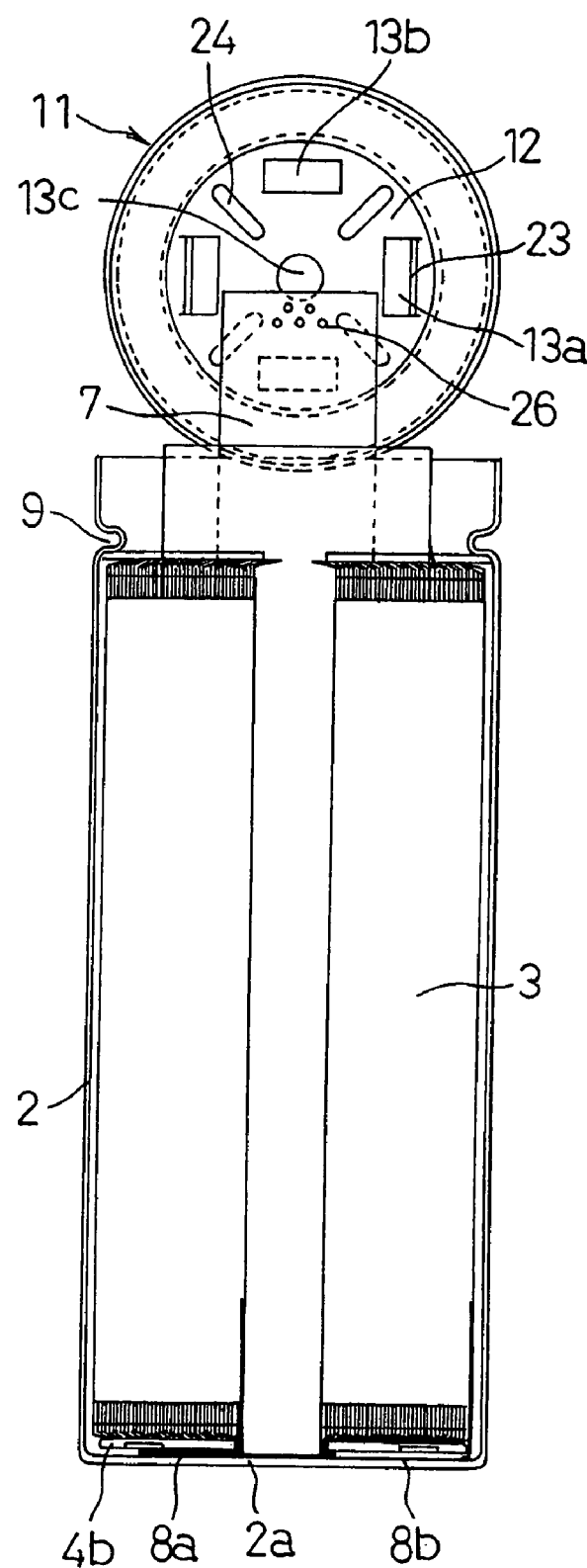

SECONDARY BATTERY WITH IMPROVED SHOCK RESISTANCE

RELATED APPLICATIONS

This application is the U.S. National Phase under 35 U.S.C. 371 of International Application No. PCT/JP2006/304310, filed on Mar. 7, 2006, which in turn claims the benefit of Japanese Application No. 2005-124629, filed on Apr. 22, 2005, the disclosures of which Applications are incorporated by reference herein.

TECHNICAL FIELD

The present invention relates to a secondary battery, and in particular to a secondary battery with an improved shock resistance that prevents malfunctioning in the event of displacement of electrode plate group due to impact or vibration.

BACKGROUND ART

In a known secondary battery 31 as a secondary battery such as a lithium ion battery or a nickel metal-hydride battery, as shown in FIG. 9, a bottomed cylindrical battery case 32 accommodates an electrode plate group 33 and an electrolyte as power generation elements, a opening of the battery case 32 is sealed with an assembled sealing plate 35 via an insulating gasket 34, a lead (not shown) of one polarity extending from one end of the electrode plate group 33 is connected to the assembled sealing plate 35, and another lead (not shown) of the opposite polarity extending from the other end of the electrode plate group 33 is connected to the inner bottom face of the battery case 32. Insulating plates 36a and 36b are arranged on both ends of the electrode plate group 33.

The assembled sealing plate 35 includes, as shown in FIG. 10, a filter 37 being formed with vent holes 38, an inner surface of which faces the inside of the battery case 32, a cap 40 formed with exhaust holes 41, a outer surface of which faces the outside in a state of being insulated from the filter 37 by a gasket 39, and a safety vent mechanism 42 accommodated in the space between the filter 37 and the cap 40, which breaks when the pressure in the battery case 32 exceeds a predetermined pressure to interrupt the current path between the electrode plate group 33 and the cap 40 and to communicate the vent holes 38 with the exhaust holes 41. The safety vent mechanism 42 is made up of a lower valve body 43 and an upper valve body 44. The outer peripheries of the lower and upper valve bodies 43 and 44 are held between the filter 37 and the cap 40 with the gasket 39 interposed therebetween to provide insulation. The center parts of the lower and upper valve bodies 43 and 44 are connected to each other, and a breakable part is formed around the center, which breaks when pressure exceeding the predetermined level is applied (see, for example, Patent Document 1).

Another known conventional technique for improving the shock resistance of batteries is to set a plastic insulating ring between the electrode plate group and the sealing plate such that the upper part of the ring makes contact with the bottom of the sealing plate while the lower part makes pressure contact with the electrode plate group to retain the electrode plate group securely in place to restrict deformation of the leads due to impact or vibration (see, for example, Patent Document 2).

Yet another known conventional battery incorporates a feature for ensuring safe escape of gas wherein a plurality of projections are formed around gas outlet holes in the lower face of the sealing plate so as to prevent the holes from being blocked by the strip-shaped lead that connects the electrode plate group with the sealing plate even when the lead is pushed up towards the sealing plate due to a rapid build-up of gas pressure in the battery case (see, for example, Patent Document 3).

[Patent Document 1] Japanese Patent Laid-Open Publication No. 9-129195

[Patent Document 2] Japanese Patent Laid-Open Publication No. 2000-182592

[Patent Document 3] Japanese Patent No. 3596918

DISCLOSURE OF THE INVENTION

Problems to be Solved by the Invention

According to the secondary battery shown in FIG. 9 and FIG. 10, when an impact is applied, the electrode plate group 33 may sometimes move towards the assembled sealing plate 35 as shown in FIG. 11. This may result in deformation of the insulating plate 36a on the side of the assembled sealing plate 35 due to the impact, causing the vent holes 38 in the filter 37 of the assembled sealing plate 35 to be blocked by the insulating plate 36a, which poses a risk that gas generated inside cannot be let out.

According to the configuration of the battery disclosed in Patent Document 2, while the electrode plate group is stopped from moving when an impact is applied and deformation of the leads is prevented, there is another problem that gas exhaust routes from around the electrode plate group may be spoiled because of the provision of the insulating ring. Forming cut-outs in the insulating ring to provide such exhaust routes will deteriorate the plastic insulating ring in strength and reduce the shock resistance effect.

According to the configuration of the battery disclosed in Patent Document 3, while gas exhaust routes are secured by the provision of projections around the gas outlet holes in the metal sealing plate, there remains the problem that the electrode plate group cannot be stopped from moving when an impact is applied, and making the projections larger for the purpose of preventing such movement would pose a risk of short-circuit because they may directly contact with the electrode plate group.

In view of the problems in the conventional techniques described above, an object of the present invention is to provide a secondary battery that can prevent malfunctioning in the event of displacement of electrode plate group due to impact or vibration.

Means for Solving the Problems

To achieve the above object, the present invention provides a secondary battery comprising a battery case for accommodating an electrode plate group and an electrolyte, with one open end of the battery case being sealed with an assembled sealing plate that accommodates a safety mechanism for exhausting pressure to the outside when the pressure in the battery case exceeds a predetermined level, wherein at least one part of vent holes in the assembled sealing plate facing the inside of the battery case is constituted of an aperture that results from formation of a turned-out portion, and a distal end of the turned-out portion is allowed to abut on an insulating plate that makes contact with one end of the electrode plate group.

According to this structure, the turned-out portion, which is provided to form vent holes or gas exhaustion passages of the safety mechanism in the assembled sealing plate, supports one end of the electrode plate group via the insulating plate, thereby preventing steadily the electrode plate group from moving even if an impact or vibration is applied thereto. There is no risk that the vent holes are blocked by displaced electrode plate group or insulating plate or by deformation of the lead which may result from the displacement, i.e., the passages are kept intact for smooth gas exhaustion and safety is ensured. The risk of disconnection between the leads extending from the other end of the electrode plate group and the battery case, which may be caused by displacement of the electrode plate group, is also eliminated. Moreover, while the lead tends to become hot because of the large amount of heat generated during high-current discharge, the turned-out portion near the sides of the lead absorbs and dissipates the heat through the entire assembled sealing plate, thereby restricting the temperature rise of the lead, which improves the high-current performance. Another effect achieved by formation of the turned-out portion is that the rigidity of the surface of the assembled sealing plate facing the inside of the battery case is improved and malfunctioning of the safety mechanism due to deformation of the assembled sealing plate followed by pressure build-up in the battery case is prevented.

According to another aspect of the present invention, a secondary battery comprises a battery case for accommodating an electrode plate group and an electrolyte, with one open end of the battery case being sealed with an assembled sealing plate that is insulated from the battery case, and a lead of one polarity extending from one end of the electrode plate group being connected to the assembled sealing plate, while another lead of the opposite polarity extending from the other end of the electrode plate group being connected to the battery case, wherein at least one part of the lead of the opposite polarity extends along an inner bottom face of the battery case and forms a turned-back portion in a middle part, with the distal end being connected to the bottom face of the battery case.

According to this structure, when an impact or vibration is applied thereto, even if the electrode plate group should move slightly towards the assembled sealing plate, such movement is readily absorbed by deformation of the lead of the opposite polarity having the turned-back portion, so that there is no risk that the lead of the opposite polarity is disconnected from the inner bottom face of the battery case, whereby the shock resistance of the battery is improved.

According to another aspect of the present invention, a secondary battery comprises a battery case for accommodating an electrode plate group and an electrolyte, with one open end of the battery case being sealed with an assembled sealing plate that accommodates a safety mechanism for exhausting pressure to the outside when the pressure in the battery case exceeds a predetermined level and that is insulated from the battery case, a lead of one polarity extending from one end of the electrode plate group being connected to the assembled sealing plate, while another lead of the opposite polarity extending from the other end of the electrode plate group being connected to the battery case, wherein at least one part of vent holes in the assembled sealing plate facing the inside of the battery case is constituted of an aperture that results from formation of a turned-out portion, a distal end of the turned-out portion being allowed to abut on an insulating plate that makes contact with one end of the electrode plate group, and wherein one of the leads of the opposite polarity extends from near the center of the electrode plate group, runs radially outwards along an inner bottom face of the battery case, and turns back so that its distal end is connected to the bottom face of the battery case at the center of the electrode plate group. Both of the above effects are achieved with this structure.

The vent hole resulting from the formation of the turned-out portion should preferably be provided on both opposite sides along a radial direction of the assembled sealing plate, with the lead of one polarity being arranged in a space therebetween, and the vent holes that are provided in this space where the lead is arranged being punched out, so that the turned-out portion will not interfere with the lead, while high heat dissipation effect is achieved and the total sum of the open areas of the vent holes is sufficiently secured.

Concaves or convexes for increasing surface rigidity may be press-formed around the open edge of the vent holes or between the vent holes in a wall of the assembled sealing plate in which the vent holes are formed, so that the surface of the assembled sealing plate facing the inside of the battery case will have sufficient surface strength to prevent malfunctioning of the safety mechanism due to deformation caused by a pressure build-up in the battery case.

The leads of the opposite polarity may extend from near the center and one outer edge of the electrode plate group, one lead extending from near the center running radially outwards along the inner bottom face of the battery case and then turning back, while the other lead extending from near the outer edge running radially inwards along the inner bottom face of the battery case, the distal ends of these leads being connected to the inner bottom face of the battery case at the center of the electrode plate group. In a battery structure designed for efficient high-current discharge, the electrode plate of one polarity (usually positive) has its lead bonded at the center while the electrode plate of the opposite polarity (usually negative) has its leads bonded to its both ends so that the leads of the opposite polarity extend from near the center and one outer edge of the electrode plate group. In such a battery, even if the electrode plate group moves slightly away from the inner bottom face of the battery case due to an impact or vibration, this movement is readily absorbed by the turned-back portion of the lead, so that there is no risk that the leads are disconnected from the inner bottom face of the battery case due to an excessive force, whereby the shock resistance of the battery is improved.

Moreover, an insulating plate interposed between the other end of the electrode plate group and the inner bottom face of the battery case may be provided with a recess opposite to the turned-back portion of the lead, so that the turned-back portion of the lead is accommodated in the recess, and the turned-back portion will not be subjected to excessive local stress and will be prevented reliably from breaking.

Furthermore, a cap that constitutes an outer surface of the assembled sealing plate may be formed with a protruding polygonal connection boss in the center of the cap, a top plan shape of the boss being a polygon of more than four sides, with exhaust holes formed in the stand-up side walls that form the sides of the polygon, so that, while each exhaust hole has a limited area so as to prevent intrusion of foreign matter that may inhibit the actuation of the safety mechanism, the total sum of the areas of all the exhaust holes is sufficiently large to enable smooth exhaustion of gas in the event of abnormality and to ensure high safety.

BRIEF DESCRIPTION OF THE DRAWINGS

FIG. 8A and FIG. 8B are longitudinal cross-sectional views illustrating the secondary battery of the same embodiment during manufacture in a process step for connecting the assembled sealing plate, longitudinally cut in planes orthogonal to each other;

BEST MODE FOR CARRYING OUT THE INVENTION

One embodiment of the secondary battery of the present invention will be hereinafter described with reference to FIG. 1 to FIG. 8B.

Figure 1:
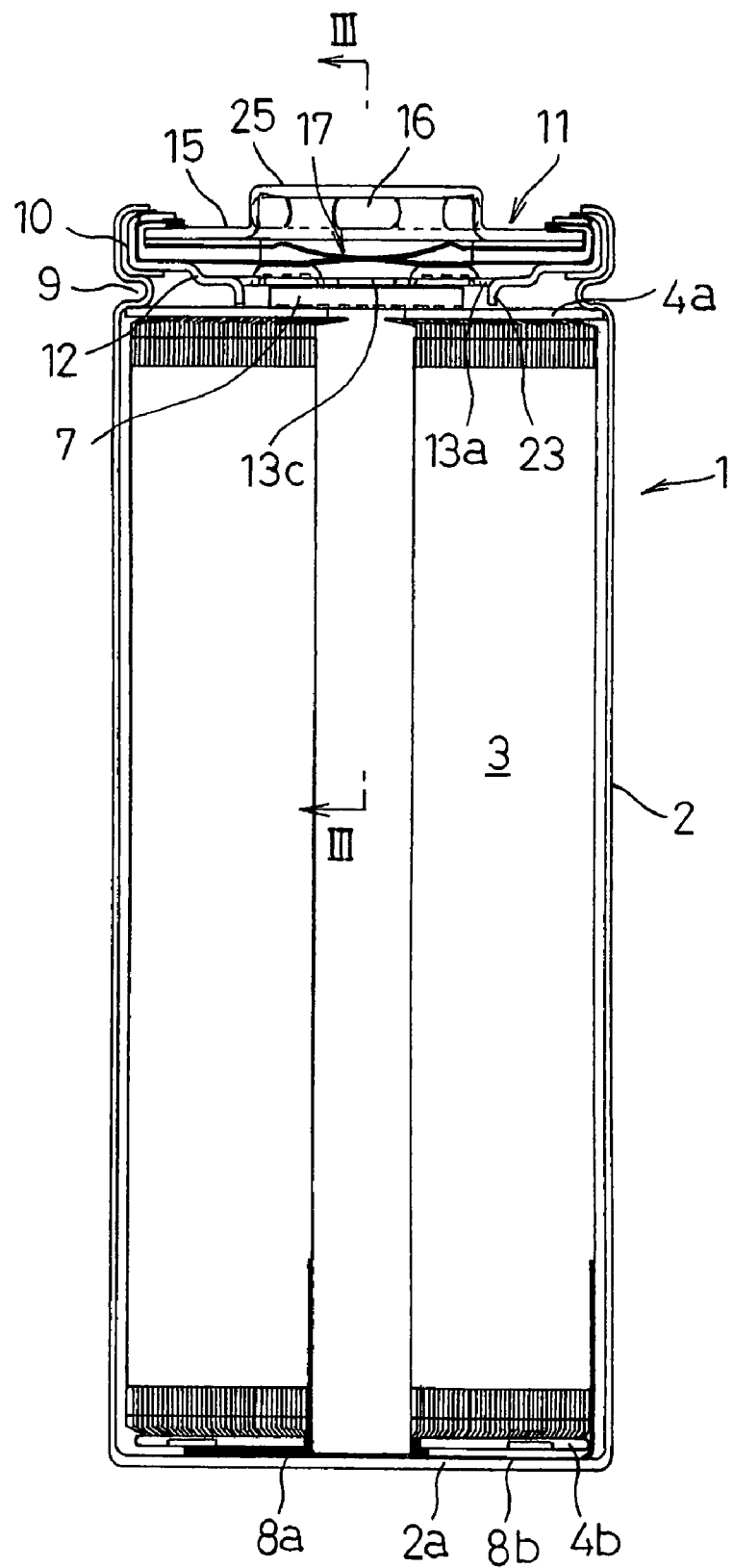
FIG. 1 is a longitudinal cross-sectional view of a secondary battery as one embodiment of the present invention.
Figure 2:
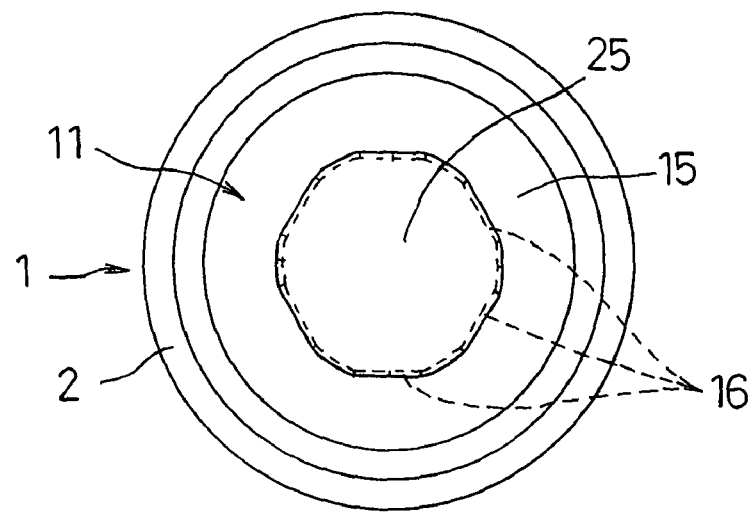
FIG. 2 is a top plan view of the secondary battery of the same embodiment.
Figure 3:
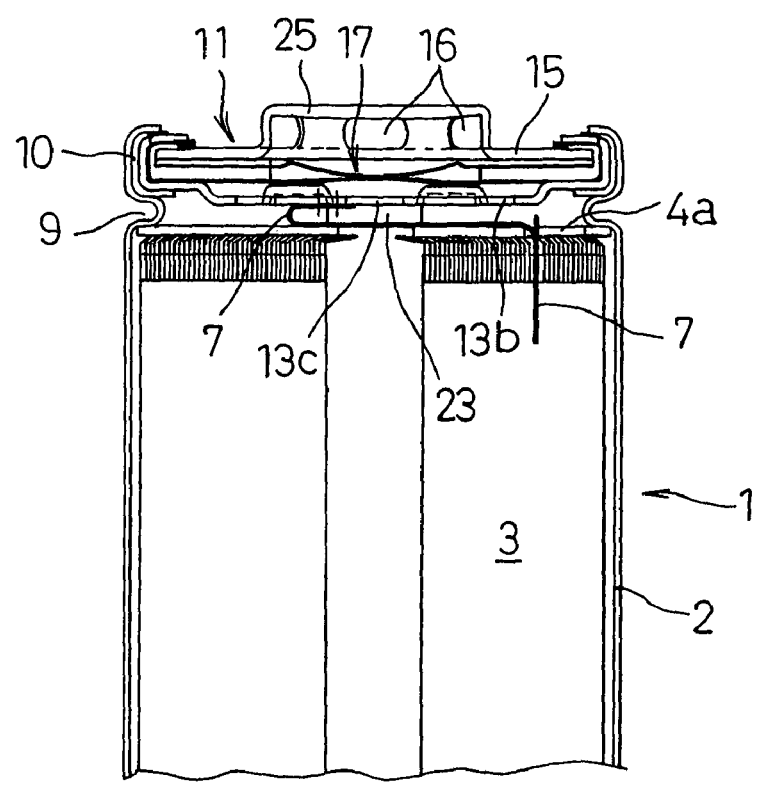
FIG. 3 is a longitudinal cross-sectional view taken along the line III-III of FIG. 1.

In FIG. 1 to FIG. 3, reference numeral 1 denotes a cylindrical secondary battery comprising a lithium ion battery, a bottomed cylindrical battery case 2 accommodating an electrode plate group 3 and an electrolyte as power generation elements. The electrode plate group 3 is composed of strip-shaped positive electrode, separator, negative electrode, and another separator stacked up and wound around a core material, which is removed after the winding. The positive and negative electrodes are layered with the separators interposed therebetween. The separators protrude from the positive and negative electrodes at upper and lower ends in an appropriate length, these upper and lower protruded parts being bent radially inwards to ensure insulation between the positive and negative electrodes. To prevent short-circuit, either the outer surface of the electrode plate group 3 is covered with an outer separator (not shown), or, an insulating resin layer (not shown) is formed on the inner surface of the battery case 2, as required. An upper insulating plate 4a and a lower insulating plate 4b are arranged to abut on the upper and lower ends of the electrode plate group 3, these all being accommodated in the battery case 2.

Figure 5:
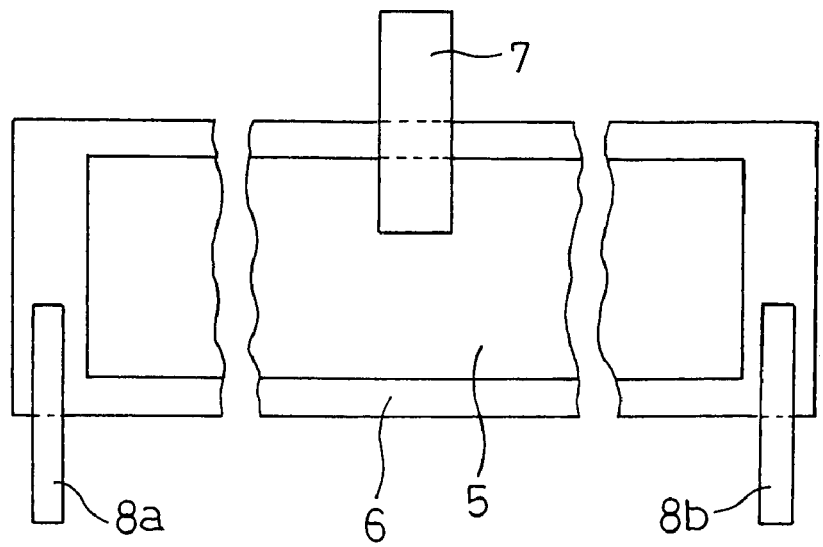
FIG. 5 is a schematic development view of the electrode plate in the electrode plate group of the secondary battery of the same embodiment.

The positive electrode in the electrode plate group 3 is made of an aluminum foil core material and positive electrode mixture coated thereon and dried, the negative electrode is made of a copper foil core material and negative electrode mixture coated thereon and dried, and the separators are made of porous polypropylene film or the like. To impart the battery with a charge/discharge reserve, the negative electrode 6 is made larger than the positive electrode 5 in the up and down direction and in the longitudinal direction as shown in FIG. 5, so that the negative electrode 6 protrudes from the upper and lower edges of the positive electrode 5 a predetermined distance and extend further from both ends. Separators are not shown in FIG. 5. A single, wide positive lead 7 is welded to the center of the positive electrode 5, and a pair of negative leads 8a and 8b having about the half width of the positive lead 7 are welded to both ends of the negative electrode 6, this being designed for enabling efficient high-current discharge from a relatively large capacity battery such as INR 26650 (outer diameter: 26 mm, height: 65 mm) according to the IEC standards.

A stepped portion 9 is provided at the upper end of the battery case 2 by forming a groove from the outer surface so that it protrudes inwards and engages from above with the outer periphery of the upper insulating plate 4a. The assembled sealing plate 11 is placed upon the stepped portion 9 inside the battery case 2 with the insulating gasket 10 interposed therebetween. The assembled sealing plate 11 is integrally fixed with the battery case 2 by applying a caulking process of bending the open edge of the battery case 2 inwards with the insulating gasket 10 interposed therebetween so that both air-tightness and electrical insulation from the battery case 2 are secured.

Figure 4A:
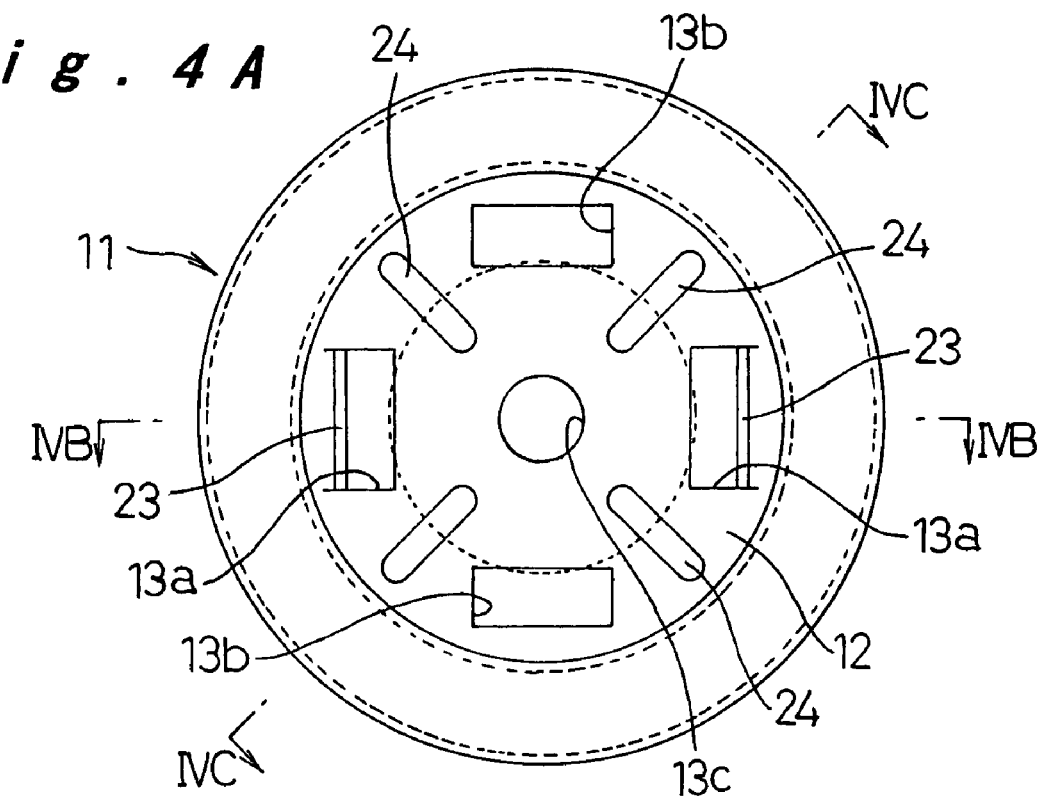
FIG. 4A to FIG. 4C illustrate the assembled sealing plate of the secondary battery in the same embodiment, FIG. 4A being a bottom plan view, FIG. 4B being a cross-sectional view taken along the line IVB-IVB of FIG. 4A, and FIG. 4C being a cross-sectional view taken along the line IVC-IVC of FIG. 4A.
Figure 4B:
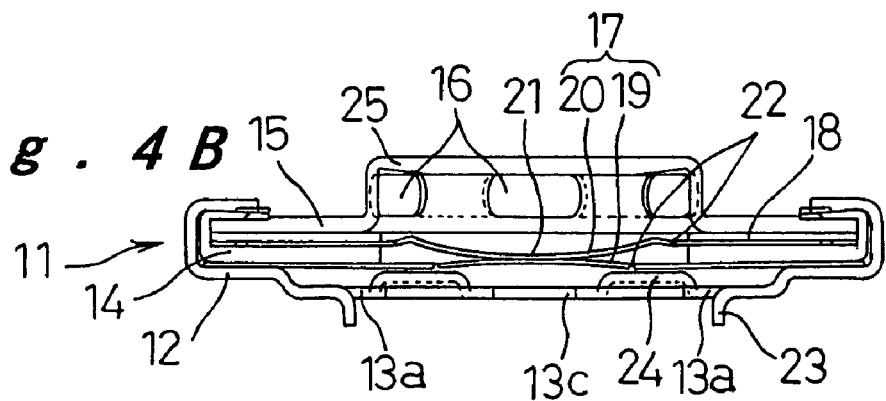
Figure 4C:
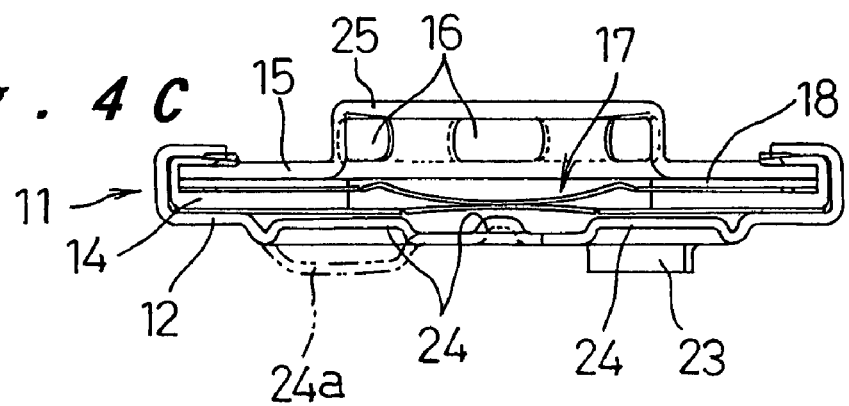

The assembled sealing plate 11 includes, as shown in FIG. 4A to FIG. 4C, a filter 12 having vent holes 13a, 13b, 13c, an inner surface of which faces the inside of the battery case 2, a cap 15 insulated from the filter 12 by a gasket 14 and having exhaust holes 16, an outer surface of which faces the outside, a safety vent mechanism (safety mechanism) 17 accommodated in the space between the filter 12 and the cap 15, the safety vent mechanism breaking when the pressure in the battery case exceeds a predetermined level to interrupt the current path between the electrode plate group 3 and the cap 15 and to communicate the vent holes 13a and 13b with the exhaust holes 16, and a PTC element 18 interposed between the safety vent mechanism 17 and the cap 15.

The safety vent mechanism 17 is made up of a lower valve body 19 and an upper valve body 20. The outer peripheries of the lower and upper valve bodies 19 and 20 are held between the filter 12 and the cap 15 with a gasket 14 interposed therebetween to provide insulation to each other. The lower and upper valve bodies 19 and 20 are connected to each other at a center connection part 21 thereof, and a breakable part 22 is formed around the center, which breaks when pressure exceeding the predetermined level is applied.

The filter 12 is formed with a pair of rectangular vent holes 13a radially opposite to each other, another pair of rectangular vent holes 13b radially opposite to each other along a direction that is orthogonal to that of the vent holes 13a, and a circular vent hole 13c in the center. The vent holes 13a are constituted of apertures that result from forming turned-out portions 23 protruding into the inside of the battery case 2. The protruding ends of the turned-out portions 23 make contact with the upper insulating plate 4a as shown in FIG. 1. If the opening width of the vent holes 13a needs to be set larger than the protruding length of the turned-out portions 23, the vent holes are formed by punching part of the filter and then turning up the remaining part. The vent holes 13b and 13c are both punched out so that they do not interfere with the positive lead 7.

The turned-out portions 23 may be provided in various manners so as not to interfere with the positive lead 7: For example, while the turned-out portions 23 are positioned on only the outer, far sides of the vent holes 13a in the example shown in FIG. 4A to FIG. 4C, another turned-out portions may be provided on the inner, near sides of the vent holes 13a and turned oppositely up toward the safety vent mechanism 17 to provide reinforcement. Or, the turned-out portions 23 may be provided intermittently around the circumference of any of the vent holes 13a. In addition to the pair of vent holes 13a, a turned-out portion 23 may also be provided to one of the vent holes 13b that does not interfere with the positive lead 7.

Reinforcing concaves 24 recessed toward inside of the assembled sealing plate 11 are provided with extending radially between the pairs of vent holes 13a and 13b of the filter 12 to increase surface rigidity of the filter 12. Instead of the reinforcing concaves 24, as shown by the phantom line in FIG. 4C, reinforcing convexes 24a that protrude into the battery case 2 may be formed. Such reinforcing concaves 24 or convexes 24a may be provided not only between the vent holes 13a and 13b but also around the edges of the vent holes 13a and 13b. The size, number, and disposition state of the reinforcing concaves 24 or convexes 24a may be designed appropriately so that the surface rigidity is made as high as possible on condition that they do not inhibit the actuation of the safety vent mechanism 17 and do not interfere with the positive lead 7.

The cap 15 is formed with a protruding connection boss 25 in its center as shown in FIG. 2 whose top plan shape is a polygon of more than four sides (being a hexagon in the illustrated example). A plurality of exhaust holes 16 are formed in the stand-up side walls that form the sides of the polygon as shown in FIG. 1, FIG. 3, and FIG. 4A to FIG. 4C. Thus, while each exhaust hole 16 has a limited area so as to prevent intrusion of foreign matter that may inhibit the actuation of the safety vent mechanism 17, the total sum of the areas of all the plurality of exhaust holes 16 is sufficiently large to ensure smooth exhaustion of gas in the event of abnormality.

The positive lead 7 of the electrode plate group 3 extends upwards from the radial center at the upper end thereof and protrudes through the upper insulating plate 4a. As shown in FIG. 8A and FIG. 8B, the assembled sealing plate 11 is set so that the top end of the positive lead 7 is positioned below and between the pair of vent holes 13a of the assembled sealing plate 11, and in this state, the distal end of the positive lead 7 is connected at welds 26 under the vent hole 13c in the center of the filter 12, after which the assembled sealing plate 11 is fitted into the open end of the battery case 2, whereby the positive lead 7 is accommodated in a turned-back state, not blocking any of the vent holes 13a, 13b, 13c, as shown in FIG. 3.

Figure 6:
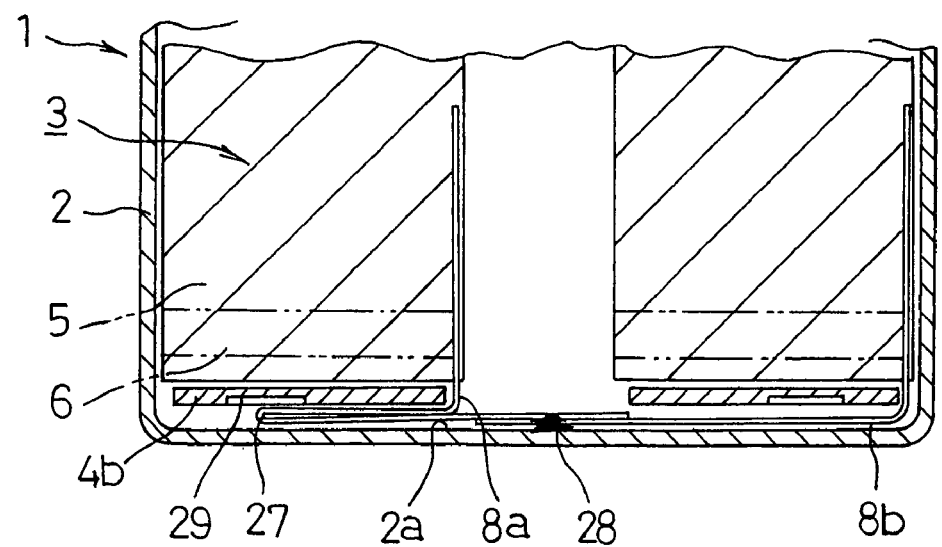
FIG. 6 is a detailed longitudinal cross-sectional view of the lower end portion of the secondary battery of the same embodiment.

The negative leads 8a and 8b of the electrode plate group 3, on the other hand, extend downwards from the radial center and one outer edge respectively at the lower end of the electrode plate group 3 as shown in FIG. 6. The negative lead 8a extending from near the center of the electrode plate group 3 is bent and run radially outwards along the inner bottom face 2a of the battery case 2 and turned back radially inwards at the turned-back portion 27, extending to the center. The negative lead 8b extending from near the outer edge of the electrode plate group 3 is turned radially inwards along the inner bottom face 2a of the battery case 2 and extends to the center. The distal ends of these negative leads 8a and 8b are connected at a weld 28 to the inner bottom face 2a of the battery case 2 at the center of the electrode plate group 3. The lower insulating plate 4b is formed with a recess 29 in the lower face opposite to the turned-back portion 27, which can accommodate at least part of the turned-back portion 27.

Figure 7C:
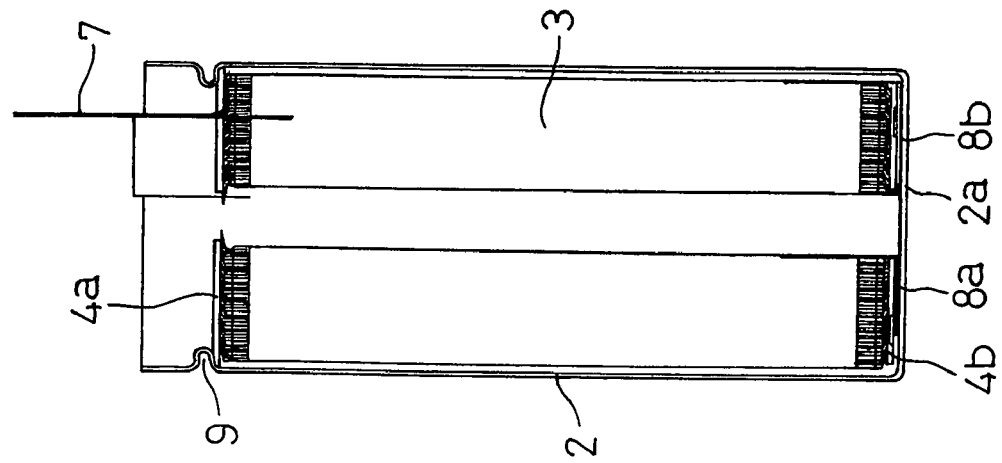
FIG. 7A to FIG. 7C are cross-sectional views illustrating the secondary battery of the same embodiment in the order of the production process steps.
Figure 7B:
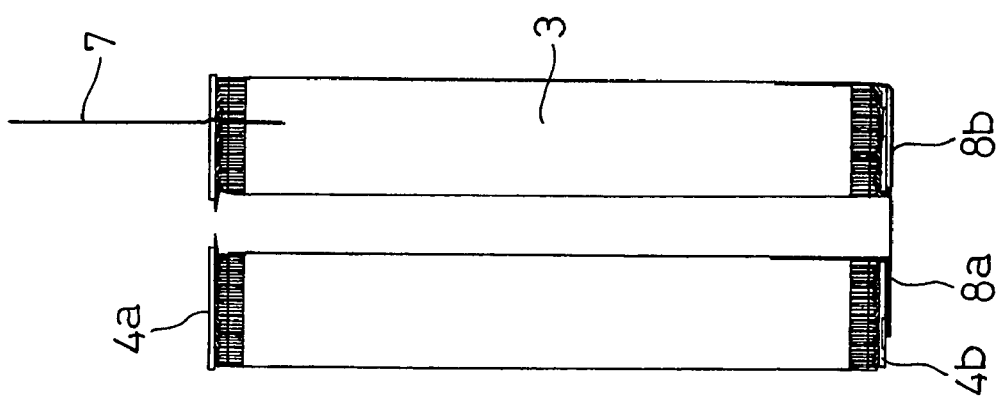
Figure 7A:
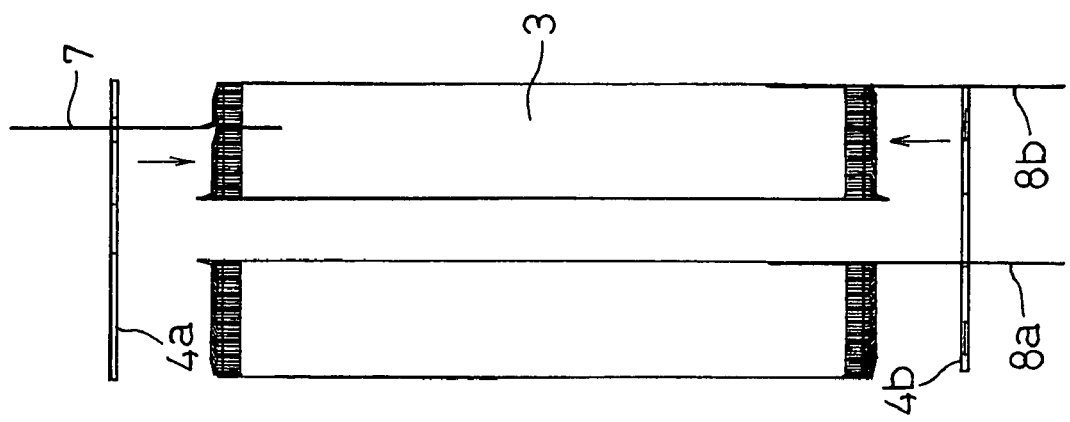
Figure 9:
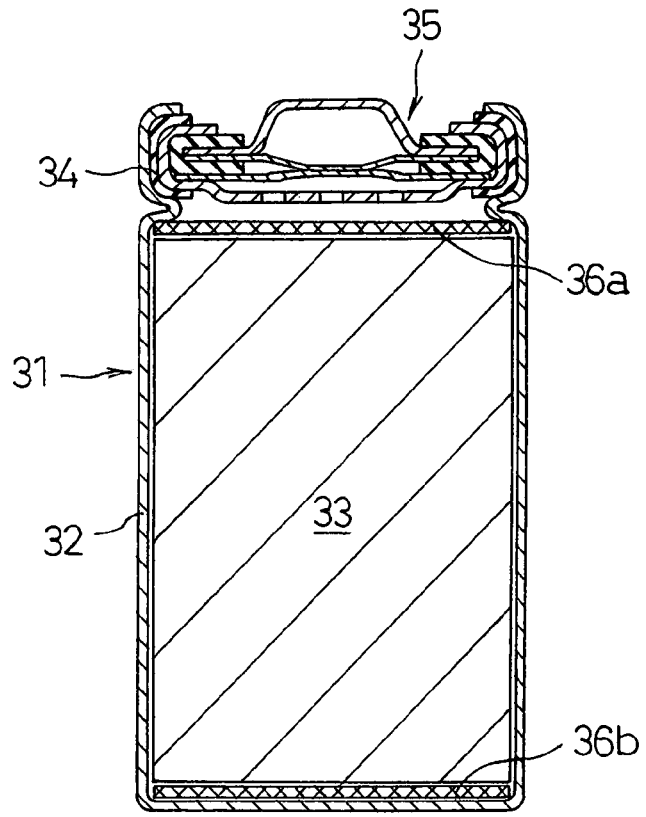
FIG. 9 is a longitudinal cross-sectional view of a conventional secondary battery.
Figure 10:
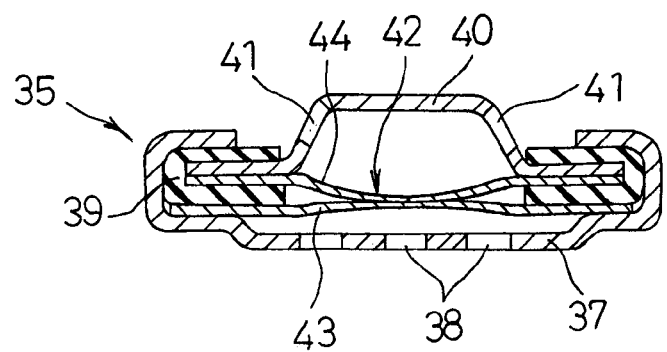
FIG. 10 is a cross-sectional view of an assembled sealing plate of the same conventional battery.
Figure 11:
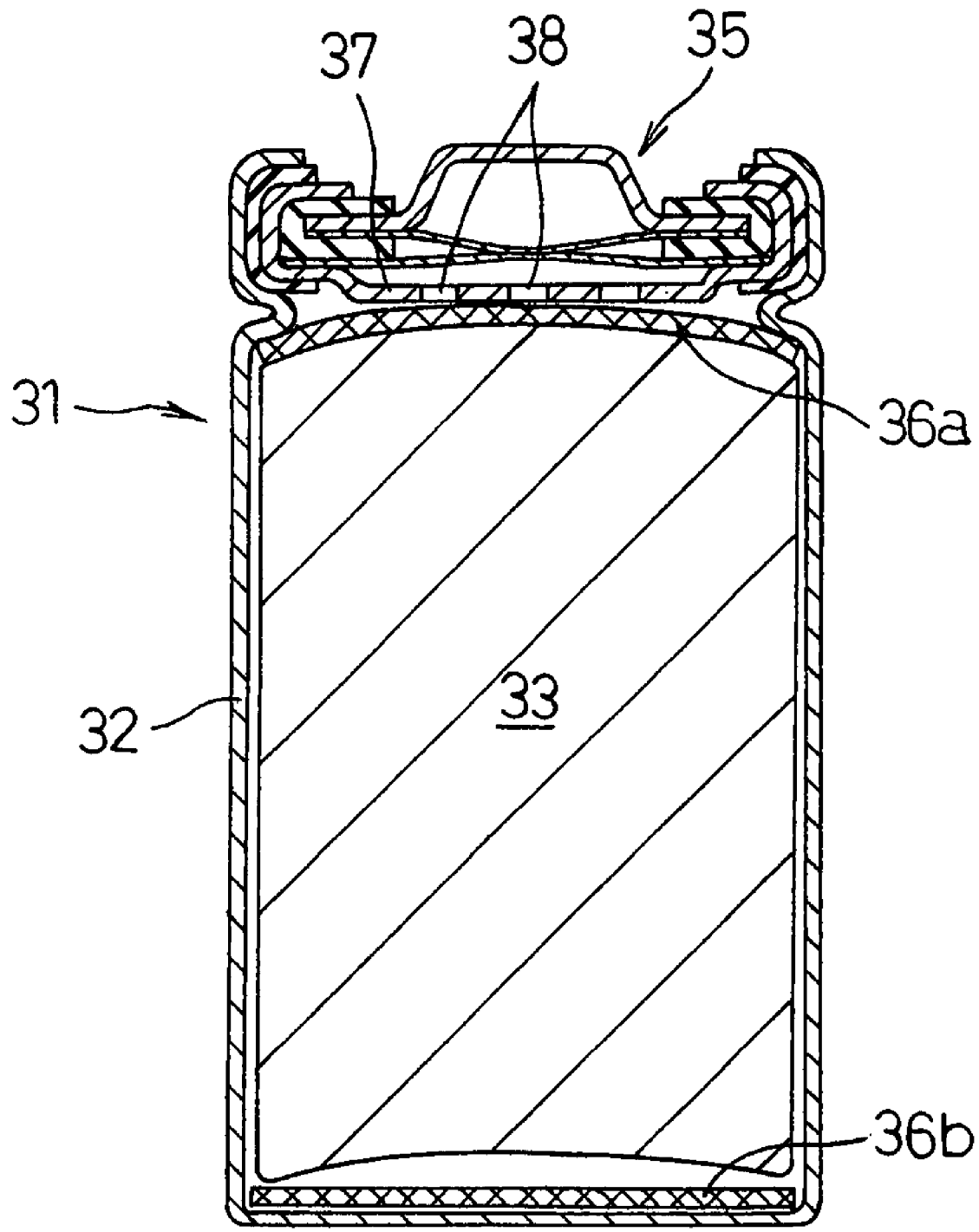
FIG. 11 is a longitudinal cross-sectional view of the same conventional secondary battery when subjected to impact.

Next, the production process of the above secondary battery 1 will be described with reference to FIG. 7A to FIG. 7C, FIG. 8A, and FIG. 8B. First, the electrode plate group 3 with the positive and negative leads 7, 8a, and 8b protruding from the upper and lower ends is produced, and as shown in FIG. 7A, the upper and lower insulating plates 4a and 4b are allowed to abut on the upper and lower ends of the electrode plate group 3, with the positive and negative leads 7, 8a, and 8b extending through the upper and lower insulating plates 4a and 4b, respectively. Next, as shown in FIG. 7B, the negative leads 8a and 8b are turned as described above. The electrode plate group 3 is then inserted into the battery case 2 as shown in FIG. 7C, the stepped portion 9 is formed at the upper end of the battery case 2 by a groove forming process to securely accommodate and fix the electrode plate group 3 in the battery case 2, the distal ends of the negative leads 8a and 8b are connected to the inner bottom face 2a of the battery case 2 by welding, and a predetermined amount of electrolyte is injected. Next, as shown in FIG. 8A and FIG. 8B, the upper end of the positive lead 7 is connected to the filter 12 of the assembled sealing plate 11 by welding as described above. After that, with the insulating gasket 10 fitted around the assembled sealing plate 11, the assembled sealing plate 11 is coupled onto the open end of the battery case 2, and the open edge of the battery case 2 is caulked to seal the opening, whereby the secondary battery 1 is completed.

According to the secondary battery 1 of the embodiment described above, the turned-out portions 23, which are provided to form vent holes 13a or gas exhaustion passages in the filter 12 of the assembled sealing plate 11, support one end of the electrode plate group 3 via the upper insulating plate 4a, thereby preventing steadily the electrode plate group 3 from moving even if an impact or vibration is applied thereto. Therefore, there is no risk that the vent holes 13a, 13b, and 13c in the filter 12 are blocked by displaced electrode plate group 3 or insulating plate 4a or by deformation of the positive lead 7 which may be caused by the displacement, i.e., the passages are kept intact for smooth gas exhaustion and safety is ensured.

With the electrode plate group 3 being restrained from moving, the risk of disconnection between the negative leads 8a and 8b extending from the other end of the electrode plate group 3 and the battery case 2, which may be caused by displacement of the electrode plate group 3, is also eliminated. Moreover, while the positive lead 7 tends to become hot because of the large amount of heat generated during high-current discharge, the turned-out portions 23 near the sides of the positive lead 7 absorb and dissipate the heat through the entire assembled sealing plate 11, thereby restricting the temperature rise of the positive lead 7, which improves the high-current performance. Another effect achieved by formation of the turned-out portions 23 is that the surface rigidity of the filter 12 of the assembled sealing plate 11 is improved and malfunctioning of the safety vent mechanism 17 due to deformation of the assembled sealing plate followed by pressure build-up in the battery case 2 is prevented.

The vent holes 13a resulting from the formation of the turned-out portions 23 are provided on both opposite sides along the radial direction of the assembled sealing plate 11, with the positive lead 7 being arranged in the space therebetween, and the vent holes 13b and 13c that are provided in this space where the positive lead 7 is arranged are punched out, so that the turned-out portions 23 do not interfere with the positive lead 7, while high heat dissipation effect is achieved and the total sum of the open areas of the vent holes 13a, 13b, 13c is sufficiently secured.

Moreover, the reinforcing concaves 24 or reinforcing convexes 24a are press-formed between the vent holes 13a and 13b in the filter 12 of the assembled sealing plate 11 to increase surface rigidity, so that the filter 12 in the assembled sealing plate 11 has sufficient surface strength to prevent malfunctioning of the safety vent mechanism 17 due to deformation caused by a pressure build-up in the battery case 2.

Furthermore, the cap 15 that constitutes an outer surface of the assembled sealing plate 11 is formed with the protruding polygonal connection boss 25 in the center thereof, with the exhaust holes 16 formed in the stand-up side walls that form the sides of the polygon, so that, while each exhaust hole 16 has a limited area so as to prevent intrusion of foreign matter that may inhibit the actuation of the safety vent mechanism 17, the total sum of the areas of all the exhaust holes 16 is sufficiently large to ensure smooth exhaustion of gas in the event of abnormality.

Moreover, the negative leads 8a and 8b extend from near the center and one outer edge of the electrode plate group 3, one negative lead 8a extending from near the center running radially outwards along the bottom face 2a of the battery case 2 and then turning back at the turned-back portion 27, while the other negative lead 8a extending from near the outer edge running radially inwards along the bottom face 2a of the battery case 2, the distal ends of these negative leads 8a and 8b being connected to the bottom face 2a of the battery case 2 at the center of the electrode plate group 3. Therefore, even if the electrode plate group 3 moves slightly away from the bottom face 2a of the battery case 2 due to an impact or vibration, such movement is readily absorbed by the turned-back portion 27 of the negative lead 8a and by deformation of the negative lead 8b, so that there is no risk that the negative leads 8a and 8b are disconnected from the bottom face 2a of the battery case 2 due to an excessive force, whereby the shock resistance of the battery is improved.

Furthermore, the lower insulating plate 4b interposed between the other end of the electrode plate group 3 and the bottom face 2a of the battery case 2 is provided with the recess 29 opposite to the turned-back portion 27 of the negative lead 8a. With the turned-back portion 27 being accommodated in the recess 29, the turned-back portion 27 will not be subjected to excessive local stress, and will be prevented reliably from breaking.

INDUSTRIAL APPLICABILITY

As described above, according to the secondary battery according to the present invention, the turned-out portions, which are provided to form vent holes in the safety mechanism accommodated in the assembled sealing plate for sealing the open end of the battery case that accommodates the electrode plate group, support one end of the electrode plate group via the insulating plate, thereby preventing the electrode plate group from moving even if an impact or vibration is applied. There is no risk that the vent holes are blocked by displaced electrode plate group or insulating plate or by deformation of the lead which may be caused by the displacement, i.e., the passages are kept intact for smooth gas exhaustion and battery safety is improved. Thus, the present invention is advantageously applicable to various secondary batteries such as lithium ion batteries and nickel metal-hydride batteries.

The invention claimed is:

1. A secondary battery comprising
a battery case for accommodating an electrode plate group and an electrolyte, with one open end of the battery case being sealed with an assembled sealing plate that accommodates a safety mechanism for exhausting pressure to the outside when the pressure in the battery case exceeds a predetermined level,
wherein at least one part of vent holes in the assembled sealing plate facing the inside of the battery case is constituted of an aperture that results from formation of a turned-out portion, and a distal end of the turned-out portion protruding into the inside of the battery case is allowed to abut on an insulating plate that makes contact with one end of the electrode plate group.

2. A secondary battery comprising
a battery case for accommodating an electrode plate group and an electrolyte, with one open end of the battery case being sealed with an assembled sealing plate that is insulated from the battery case, and a lead of one polarity extending from one end of the electrode plate group being connected to the assembled sealing plate, while another lead of the opposite polarity extending from the other end of the electrode plate group being connected to the battery case,
wherein at least one part of the lead of the opposite polarity extends along an inner bottom face of the battery case and forms a turned-back portion in a middle part, with the distal end being connected to the inner bottom face of the battery case, and
wherein at least one part of vent holes in the assembled sealing plate facing the inside of the battery case is constituted of an aperture that results from formation of a turned-out portion protruding into the inside of the battery case.

3. A secondary battery comprising
a battery case for accommodating an electrode plate group and an electrolyte, with one open end of the battery case being sealed with an assembled sealing plate that accommodates a safety mechanism for exhausting pressure to the outside when the pressure in the battery case exceeds a predetermined level and that is insulated from the battery case,
a lead of one polarity extending from one end of the electrode plate group being connected to the assembled sealing plate,
while another lead of the opposite polarity extending from the other end of the electrode plate group being connected to the battery case,
wherein at least one part of vent holes in the assembled sealing plate facing the inside of the battery case is constituted of an aperture that results from formation of a turned-out portion, a distal end of the turned-out portion protruding into the inside of the battery case being allowed to abut on an insulating plate that makes contact with one end of the electrode plate group, and
wherein one of the leads of the opposite polarity extends from near the center of the electrode plate group, runs radially outwards along an inner bottom face of the battery case, and turns back so that its distal end is connected to the inner bottom face of the battery case at the center of the electrode plate group.

4. The secondary battery according to claim 1, wherein the vent hole resulting from the formation of the turned-out portion is provided on both opposite sides along a radial direction of the assembled sealing plate, with the lead of one polarity being arranged in a space therebetween, and the vent holes that are provided in this space where the lead is arranged being punched out.

5. The secondary battery according to claim 3, wherein the vent hole resulting from the formation of the turned-out portion is provided on both opposite sides along a radial direction of the assembled sealing plate, with the lead of one polarity being arranged in a space therebetween, and the vent holes that are provided in this space where the lead is arranged being punched out.

6. The secondary battery according to claim 4 or 5, wherein concaves or convexes for increasing surface rigidity are press-formed around the open edge of the vent holes or between the vent holes in a wall of the assembled sealing plate in which the vent holes are formed.

7. The secondary battery according to claim 2 or 3, wherein the leads of the opposite polarity extend from near the center and one outer edge of the electrode plate group, one lead extending from near the center running radially outwards along the inner bottom face of the battery case and then turning back, while the other lead extending from near the outer edge running radially inwards along the inner bottom face of the battery case, the distal ends of these leads being connected to the inner bottom face of the battery case at the center of the electrode plate group.

8. The secondary battery according to claim 2 or 3, wherein an insulating plate interposed between the other end of the electrode plate group and the inner bottom face of the battery case is provided with a recess opposite to the turned-back portion of the lead.

9. The secondary battery according to any one of claims 1, 2 and 3, wherein a cap that constitutes an outer surface of the assembled sealing plate is formed with a protruding polygonal connection boss in the center of the cap, a top plan shape of the boss being a polygon of more than four sides, with exhaust holes formed in stand-up side walls that form the sides of the polygon.

* * * * *